United States Patent
Hartmann et al.

(10) Patent No.: US 7,102,799 B2
(45) Date of Patent: Sep. 5, 2006

(54) METHOD FOR ELECTRONIC IMAGE RECTIFICATION IN LASER SCANNER DEVICES

(75) Inventors: Thomas Hartmann, Uffing am Staffelsee (DE); Gerhard Doering, Schloeben (DE)

(73) Assignee: Carl Zeiss Jena GmbH, Jena (DE)

( * ) Notice: Subject to any disclaimer, the term of this patent is extended or adjusted under 35 U.S.C. 154(b) by 778 days.

(21) Appl. No.: 10/110,386

(22) PCT Filed: Aug. 7, 2001

(86) PCT No.: PCT/EP01/09104

§ 371 (c)(1),
(2), (4) Date: Aug. 29, 2002

(87) PCT Pub. No.: WO02/15561

PCT Pub. Date: Feb. 21, 2002

(65) Prior Publication Data

US 2003/0103249 A1 Jun. 5, 2003

(30) Foreign Application Priority Data

Aug. 11, 2000 (DE) .................... 100 39 248

(51) Int. Cl.
*H04N 1/04* (2006.01)
(52) U.S. Cl. ............... 358/474; 358/488; 358/486; 382/100; 382/141; 348/219.01
(58) Field of Classification Search ........... 358/474, 358/488, 486, 518, 406, 447, 475, 302, 505; 382/100, 141, 209, 218, 219.01; 348/219.01
See application file for complete search history.

(56) References Cited

U.S. PATENT DOCUMENTS

| | | | | |
|---|---|---|---|---|
| 3,441,949 A | * | 4/1969 | Rolon | 347/248 |
| 4,482,902 A | * | 11/1984 | Bailey et al. | 347/254 |
| 5,373,371 A | * | 12/1994 | Masui | 358/444 |
| 5,774,574 A | * | 6/1998 | Hoki | 382/149 |
| 6,373,518 B1 | * | 4/2002 | Sogawa | 348/43 |
| 6,591,010 B1 | * | 7/2003 | Russin | 382/209 |
| 2003/0103249 A1 | * | 6/2003 | Hartmann et al. | 358/505 |

FOREIGN PATENT DOCUMENTS

| | | |
|---|---|---|
| DE | 199 48 343 | 5/2000 |
| GB | 2 297 613 | 8/1996 |
| WO | WO92/01264 | 1/1992 |

* cited by examiner

*Primary Examiner*—Douglas Q. Tran
*Assistant Examiner*—Negussie Worku
(74) *Attorney, Agent, or Firm*—Reed Smith LLP (57) ABSTRACT

In a method for electronic image rectification in pixel-by-pixel scanning of a substrate by a bundled electromagnetic beam, the pixels are read out one after the other in readout intervals of constant predetermined duration. In order to improve image quality, the deviation between a reference scanning movement and an actual scanning movement carried out on the reference substrate is initially determined in a calibration process, for example, by a reference substrate with a known geometric surface structure. Depending on this deviation, a delay interval is determined for a pixel and the start of the readout interval of this pixel or of the subsequent pixel is delayed by this delay interval. The information about the delay interval is stored. In an analysis process for examining a substrate, the stored information about the delay interval is accessed for the pixel, and the delay interval is added before or after the readout interval.

13 Claims, 5 Drawing Sheets

Fig.5

METHOD FOR ELECTRONIC IMAGE RECTIFICATION IN LASER SCANNER DEVICES

CROSS-REFERENCE TO RELATED APPLICATIONS

This application claims priority of International Application No. PCT/EP01/09104, filed Aug. 7, 2001 and German Application No. 100 39 248.2, filed Aug. 11, 2000, the complete disclosures of which are hereby incorporated by reference.

BACKGROUND OF THE INVENTION a) Field of the Invention

The invention is directed to a method for electronic image rectification in pixel-by-pixel scanning of a substrate by means of a bundled electromagnetic beam, especially a laser beam, in which the pixels are read out successively during associated readout intervals of constant duration. The invention is further directed to laser scanning devices such as laser scanning microscopes, chip readers and the like, with scanning light points.

b) Description of the Related Art

Methods of the type mentioned above are suitable particularly for image data generation for electronic image analysis. A substrate is resolved into a multitude of pixels which are scanned, usually line by line. Optical scanning has proven successful for scanning extended object fields because of the higher scan speed. Therefore, it is preferable to use scanning devices in which an illuminating light point scans over the substrate through the use of oscillating mirrors, particularly galvanometer mirrors or rotating polygon prism mirrors. The light influenced by the substrate is detected by a detection device and evaluated. The image information obtained in this way is subsequently stored by pixel. When all of the information associated with the individual pixels is put together, a total image can be generated which can be analyzed or processed further by image processing methods which are known per se.

Because of the pixel-type construction, the quality of the total image obtained is highly dependent on the reproducibility of the geometric ratios of the substrate in the image. This is primarily a matter of correlating the image information read out by the detection device to spatially defined pixels. It is immediately apparent that interference can occur in the correlation due to variations or deviations in a predetermined reference scanning movement. For example, when the image is divided into parcels by the subsequent steps and a "measurement" is generated from the pixels of a parcel, distortion of the image can cause an erroneous correlation and accordingly an erroneous measurement. Image rectification by software prior to further image processing steps requires more computing time and can lead to increased crosstalk between the "measurements" of adjacent parcels. Preventing such artifacts requires time-consuming algorithms which likewise increase the computing time for image processing in some cases.

For this reason, efforts have been made in further developments to actualize a predetermined reference scanning movement in the most precise manner possible, which involves minimizing deviations between the position of the laser beam during acquisition of a pixel value and the ideal reference position as far as possible. However, with the forward feed devices which are usually used for this purpose, precise scanning movements can be realized only at a very high cost in apparatus. Moreover, a systematic residual error between the reference scanning movement and an actually performed scanning movement can also not be entirely eliminated in this case. These deviations are noticeable as distortions in the total image composed of the pixels.

Another possibility for improving the image quality consists in electronically reworking the total image obtained from the scanning process. However, as was already mentioned, the expenditure entailed by a reworking of this kind is considerable and it is therefore undesirable in practice.

OBJECT AND SUMMARY OF THE INVENTION

It is the primary object of the invention to develop a method of the type mentioned in the beginning by which an image with low distortion is obtained already immediately after the scanning process. The invention has the further object of providing a corresponding scanning device.

This object is met by a method of the type mentioned above in which the deviation between a reference scanning movement and an actual scanning movement carried out on the reference substrate is initially determined in a calibration process, e.g., by means of a reference substrate with a known geometric surface structure, a delay interval is determined depending on the deviation for a pixel and the start of the readout interval for this pixel and/or for the subsequent pixel is delayed by this delay interval, the information about the delay interval is stored, the associated stored information is accessed in an analysis process for examining the substrate for every pixel, and the delay interval is added before or after the readout interval.

Figure 4:
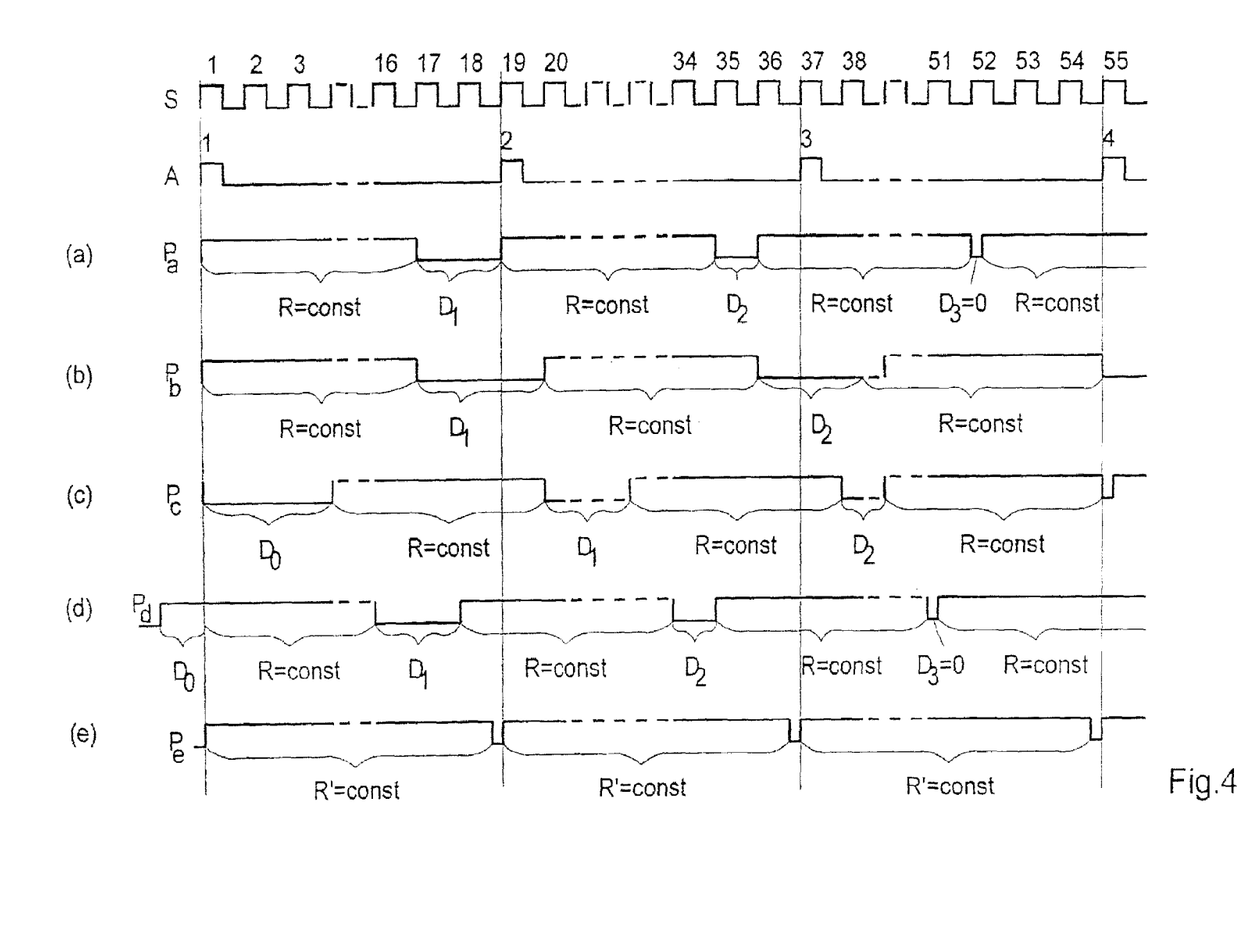
FIG. 4 (*a to e*) shows curves illustrating the control of the scanning movement and the control of the readout interval.

According to the invention, a system clock, represented by curve S in FIG. 4, is generated by a system clock generator. A new clock is started with every rising edge, for example. Further, in FIG. 4, curve A represents the control of the scanning movement, which also takes place in a timed manner, wherein the clock length of the control of the scanning movement is a constant multiple of system clock units, so that a new control value is always generated for the scanning device again after a constant number of system clock units.

As is shown by characteristic line $P_e$ in FIG. 4(e) by way of example, the timing of the readout interval can be synchronized with the timing of the control pulses for the scanning movement; in the present example, the length of the scanning interval R' corresponds to the length of the control clock of the scanning device.

The readout of the pixels on the substrate is carried out in immediately successive predetermined readout intervals of constant duration. The detected image information is acquired and stored with every time interval and is correlated to the geometric location and corresponding image pixel derived from the reference scanning movement. It would also be conceivable to implement two or more readout intervals during a control clock of the scanning device in the known procedure, in which case every readout interval would correspond to a pixel, or, conversely, to generate a greater number of control values than pixels read in.

However, when the actual scanning movement does not follow the reference scanning movement exactly, distortions may occur in the image during the reading out of image information resulting in the disadvantages mentioned above. For example, if the forward feed speed of the laser beam relative to the substrate is too slow because of slight errors, then, given a readout regime corresponding to curve $P_e$ in FIG. 4(e), at the start of the second readout clock, the laser beam would still be located in the area associated with the previous pixel. However, the information detected in this area is already associated with the next pixel, so that the information content of this pixel is rendered erroneous. Such interference between a reference scanning movement and an actual scanning movement can occur in the direction of a line as well as in a direction transverse to the lines.

According to the invention, this strict coupling between the control of the scanning device and the control of the readout intervals according to FIG. 4 (e) is eliminated. For this purpose, the systematic deviation between a reference scanning movement and a scanning movement which is actually carried out, which systematic deviation would lead to image distortion, is initially determined experimentally in a calibrating process, e.g., based on a reference structure. Delay intervals are then determined depending on these determined deviations and are inserted between successive readout intervals or before a first readout interval in order to correct the deviations. In this way, the above-mentioned crosstalk effects can be sharply reduced since it can be better ensured that only image information from the geometrically correct location on the substrate is assigned to the individual pixels with greater likelihood in a subsequent scanning step when the substrate to be examined is scanned. The image quality is accordingly improved compared to the conventional method.

In an advantageous arrangement of the method, the substrate is scanned line by line, every line comprising a multitude of pixels. For this purpose, a delay interval which is to be inserted subsequently is determined in the calibrating process for every pixel of a line depending on the deviation and the information on the delay interval is stored. In the analysis process, the information is accessed for every individual pixel of a line and the delay interval which is obtained for the respective pixel from the stored information and in which no readout takes place is inserted as a pause after the readout interval. Since it can be assumed with line-by-line scanning that the systematic errors repeat when every line is scanned, it is sufficient to store the information on the delay intervals for only one line. This can be carried out, for example, by an approximation function from which the delay intervals can be calculated for the individual pixels in the subsequent analysis process.

In another advantageous arrangement of this method, the information on the delay interval associated with the pixel is stored individually for each pixel during the calibrating process so as to be correlated to its address in the line. In the analysis process, the information with the same address in the line is accessed for every pixel. In this way, the computing expenditure during analysis can be kept low. Individual information is preferably stored in tables in long-term memory, so that it is available for a large number of substrate analyses, but can be changed, if required, by recalibrating.

In order to reduce expenditure on computing and storage and to reduce the image acquisition time, it can also be advantageous to scan all lines in the same direction, i.e., with respect to a raster image, no scanning takes place when returning to the start of a line. On the other hand, it can also be advantageous to use this method in both directions in order to reduce expenditure on apparatus and calibration for a pixel-exact matching of the forward image and return image.

The method according to the invention can be realized in principle by analog arrangements. However, it is preferably carried out in a clocked system in which the control of the scanning movement and the readout of the pixels are carried out in a timed manner in conformity to a system clock. Clock generators suitable for this purpose are known to the person skilled in the art and therefore require no further explanation. In addition, the scanning movement is controlled with a control clock whose duration is an integral multiple of a system clock unit. Again, the constant duration of the readout intervals is also an integral multiple of the system clock unit. On the other hand, the duration of the delay intervals which depends on the determined deviation is a pixel-variable integral multiple of the system clock unit. For reasons relating to the system, delay intervals whose duration is zero are also taken into account in the present application, so that, in practice, two readout intervals can follow one another directly. Otherwise, the readout interval of a subsequent pixel is started immediately after a delay interval is concluded. Since the duration of the readout intervals is shorter than the duration of the control clock of the scanning movement, situations in which the actual scanning movement is in advance of the reference scanning movement can also be compensated. On the other hand, when the actual scanning movement lags behind the reference scanning movement, a delay interval of suitable duration, which is this case is a multiple of a system clock unit, is interposed before the start of the next readout interval.

In another advantageous arrangement of the invention, the duration of the longest delay interval that can be added subsequently is twice as long as the difference of the duration between the control clock and the readout interval. This is appropriate for a situation in which the forward feed speed of the laser beam in a defined speed interval approximates the average forward feed speed.

For a line-by-line readout of pixels, it is advantageous to predetermine a linear path/time function as reference scanning movement in the line direction. In this case, a readout interval of constant duration can reasonably be used over the entire line.

The procedure described above is suitable particularly for a scanning device in which the electromagnetic beam is guided over a line of the substrate by means of a swivelable, driven deflecting mirror. A high scanning speed can be realized in the line direction in this way. Since the image quality is highly dependent on the calibrating process in the method described above, it is important to use the most suitable reference substrate in order to determine the systematic deviations between the reference scanning movement and a scanning movement which is actually carried out. Therefore, an optical grating, for example, is preferably used in the calibrating process as a reference substrate.

Switching between the individual lines of the substrate is carried out, for example, by an additional swivelable deflecting mirror or by a linear forward feed which achieves a movement of the substrate transverse to the line direction. In addition to variation in the transverse forward feed speed in the principal movement direction, which is not considered herein, variations can also occur in longitudinal direction of the lines during transverse forward feed, i.e., the scanning movement in transverse direction to the lines is carried out in a certain S-shaped manner. These errors which are likewise systematic manifest themselves in the obtained image as wavy distortions.

This distortion effect can be reduced in the following manner. The substrate is scanned line by line, every line comprising a multitude of pixels, and the scanning movement has a movement component in the line direction and a movement component transverse to the line direction. In the calibrating process, the systematic deviation of the transverse movement in the line direction between the reference scanning movement and the scanning movement actually carried out on the reference substrate is determined for every first pixel of a line. A delay interval which is to be inserted in front and which has a positive or negative duration by which the start of the readout interval is to be offset in order to compensate for deviations is determined depending on the deviation, and the information about the delay interval to be inserted in front is stored for each line. In the analysis process, the information which concerns the delay interval to be inserted in front and which is stored for the respective line is accessed for every first pixel of a line and the start of the readout interval of the first pixel of the line is offset by the delay interval.

In this way, it can be ensured in every line that the readout of the first pixel is started precisely when the light spot of the scanning beam is actually located over the correct scanning location on the substrate.

In another advantageous arrangement of this method, the information on the delay intervals to be inserted in front is also stored individually so as to be correlated to the line address in the calibrating process so that, in the subsequent analysis process, the associated delay interval to be inserted in front can be accessed for the first pixel of a line without additional computing operations. Due to the fact that in line-by-line scanning no scanning takes place during the line return and during the return of the scanning beam to the start of a line, the readout intervals can be continued again with every line to be scanned. Therefore, it is possible not only to carry out a time delay in the strict sense with the delay interval to be inserted in front, but also to permit a time delay having a negative duration, i.e., to allow the start of the readout interval of a first pixel to be moved forward.

A linear path/time function is preferably predetermined as reference scanning movement in the direction transverse to the lines.

In particular, when the method is implemented in connection with a scanning device, the relative movement between the substrate and the laser beam in the direction transverse to the lines is preferably carried out in that the substrate is moved under the electromagnetic beam in a continuous movement. Since the movement speeds are considerably slower in this case than when scanning in the line direction, a movable stage or table can be used for this purpose, for example.

The implementation of the method described above, including its variants, is preferably carried out in a conventional scanning device in which the devices for controlling the scanning movement can remain unchanged. According to the invention, a scanning device is accordingly provided which comprises a laser source for generating a laser beam, deflection devices for orienting the laser beam on a portion of a substrate to be examined which have a swivelable deflecting mirror in order to swivel the laser beam over the substrate along a scanning line, a table which holds the substrate and which is displaceable in direction transverse to the scanning line, a detection device for pixel-by-pixel readout of the substrate by reception of the light that is influenced by the portion being examined, control devices for the swivelable deflecting mirrors and for the table for generating a scanning movement of the laser beam relative to the substrate, a control device for the detection device for determining the start of readout intervals for the pixels. Further, a delay interval generator is provided for generating delay intervals of a corresponding duration depending on deviations between a reference scanning movement and an actual scanning movement, so that the readout intervals can be offset in time by these delay intervals. Images with very low distortion which do not require any further reworking are obtained by means of a scanning device of this kind already immediately after scanning the substrate.

The invention will be described in the following with reference to an embodiment example which is shown more fully in the drawings.

BRIEF DESCRIPTION OF THE DRAWINGS

In the drawings:

FIG. 2 (*a, b*) shows two graphs illustrating the path/time curve of a reference scanning movement and an actual scanning movement in which only the movement component in the line direction is shown;

FIG. 3 (*a, b c*) shows a reference substrate with a straight reference line transverse to the line direction and the image of this reference line obtained due to systematic errors compared to the reference image of the reference substrate and the image of the reference line after image rectification;

DESCRIPTION OF THE PREFERRED EMBODIMENTS

Figure 1:
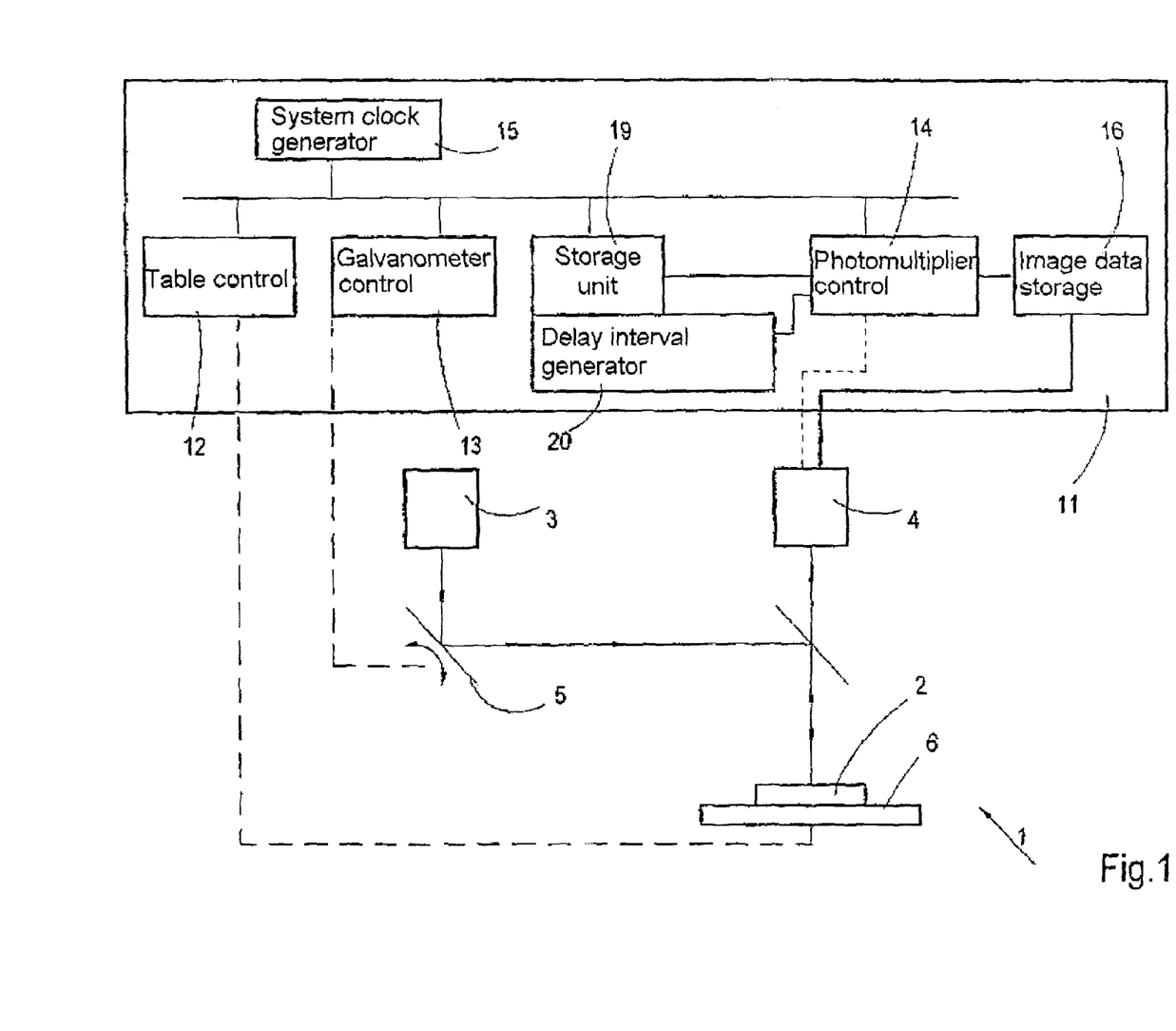
FIG. 1 schematically shows a scanning device by which a method for electronic image rectification can be carried out.

FIG. 1 shows a scanning device 1 by which a substrate 2 can be scanned pixel by pixel by means of a laser beam. For this purpose, the scanning unit 1 has a laser 3 as radiation source whose light can be directed by deflection devices to a punctiform portion of the substrate 2. The light influenced by the punctiform portion is detected by a detection device 4, for example, a photomultiplier, and is read out pixel for pixel.

For scanning the substrate 2, one of the deflection devices is constructed as a swivelable deflecting mirror 5 which, in the embodiment example, is a swiveling mirror of a galvanometer. By swiveling the mirror back and forth about an axis of rotation, the laser beam is guided over the substrate in a straight-line movement in such a way that a whole line is swept over.

As can further be seen from FIG. 1, the scanning device 1 has a table 6 on which the substrate 2 is clamped. This table 6 is movable by suitable driving means transverse to the straight-line scanning movement of the laser beam which is caused by the deflecting mirror 5. The forward feed of the table 6 serves to generate the movement component of the scanning movement transverse to the line direction.

Figure 5:
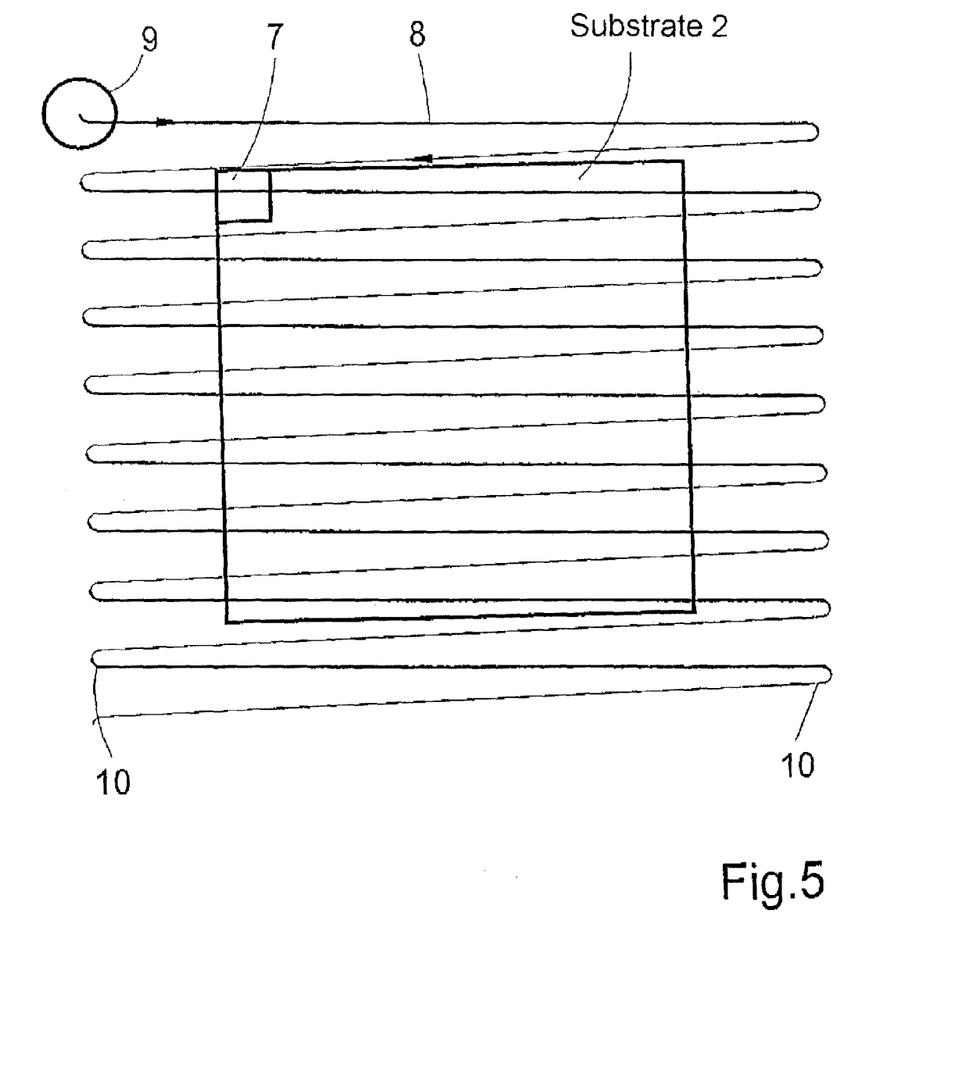
FIG. 5 shows a view illustrating the scanning movement over the substrate in the coordinates of the substrate.

In cooperation with the deflecting mirror 5 and the table 6, a line-by-line scanning movement can be realized as illustrated in FIG. 5 with reference to the coordinates of the substrate 2. The substrate 2 is shown in a highly simplified way with only a very low number of horizontal lines and pixels arranged therein. Usually, the edge lengths of the pixels are on the order of magnitude of several micrometers with several thousand pixels, e.g., 6000 pixels, per line and a corresponding quantity of lines. A pixel, designated by 7, is shown for purposes of illustration. The curve of the center point of a scanning light spot 9 which results from the back-and-forth swiveling movement of the deflecting mirror 5 and a continuous forward feed movement of the table 6 with the substrate 2 is designated by 8. Due to the reversal of the movement direction of the deflecting mirror 5, sharp changes in speed result in the line direction particularly in the line reversal areas 10. However, an extensively uniform scanning speed in the line direction is also important for achieving the most uniform possible scanning, so that the reversal points 10 are situated outside the area to be scanned and the scanning is carried out essentially in the linear speed area of the movement of the deflecting mirror 5.

In practice, however, systematic errors are always superimposed on this idealized reference scanning movement 8 shown in FIG. 5. These systematic errors can only be compensated to the extent of a reproducible residual error by calibration of the deflecting mirror 5 and table 6, so that an actual scanning movement diverges from the reference scanning movement shown in FIG. 5.

The scanning device 1 further comprises a control system 11 (see FIG. 1) which has suitable control modules 12 and 13 for controlling the deflecting mirror 5 and the table 6 for converting the reference scanning movement 8, shown in FIG. 5, as accurately as possible. The control system 11 further comprises a control device for the photomultiplier by which the image information detected by the detection device 4 can be read out. In order to ensure an allocation of the read out image information to geometric locations on the substrate 2, the control device of the photomultiplier is connected with the control devices 12 and 13 for the reference scanning movement in that the latter are operated depending on the clock signals of a system clock generator 15 which is likewise provided in the control system 11. However, only a coupling of the photomultiplier control with the reference movement is achieved by this timed connection. However, the image information which is read out over several individual system cycles and which is accumulated over readout intervals of constant duration can accordingly only be allocated to a path portion and, therefore, to a geometric location on the substrate which is derived from the reference scanning movement. A pixel is allocated to this location, the determined image information of the readout interval being allocated to this pixel and stored in an image data storage 16 of the control system 11.

However, the actual scanning movement occasionally matches the reference scanning movement, so that the allocation errors or crosstalk effects mentioned in the beginning can occur. In order to prevent these effects which impair the image quality, the deviation of the movement components in the line direction resulting from systematic movement errors of the deflecting mirror 5 is compensated in the following manner.

Figure 2A:
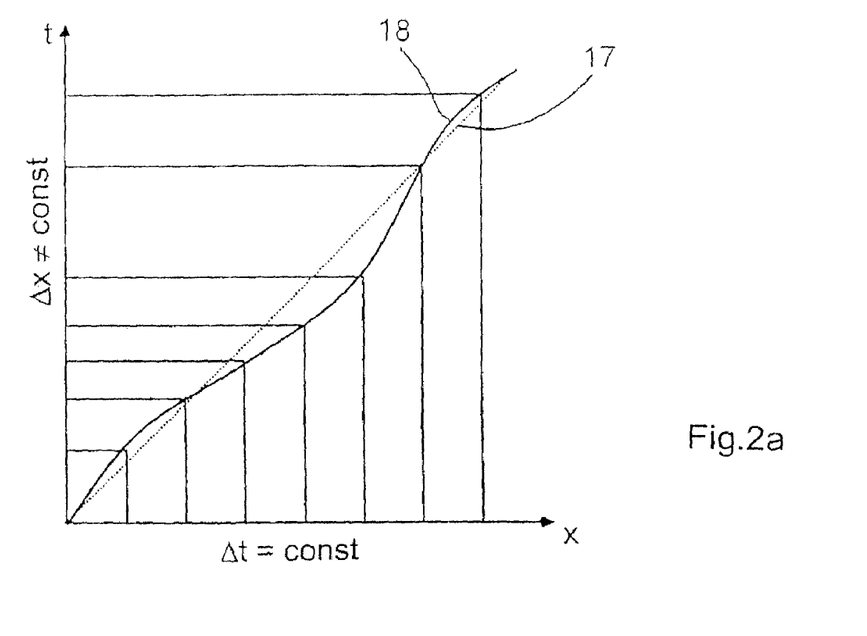
Figure 2B:
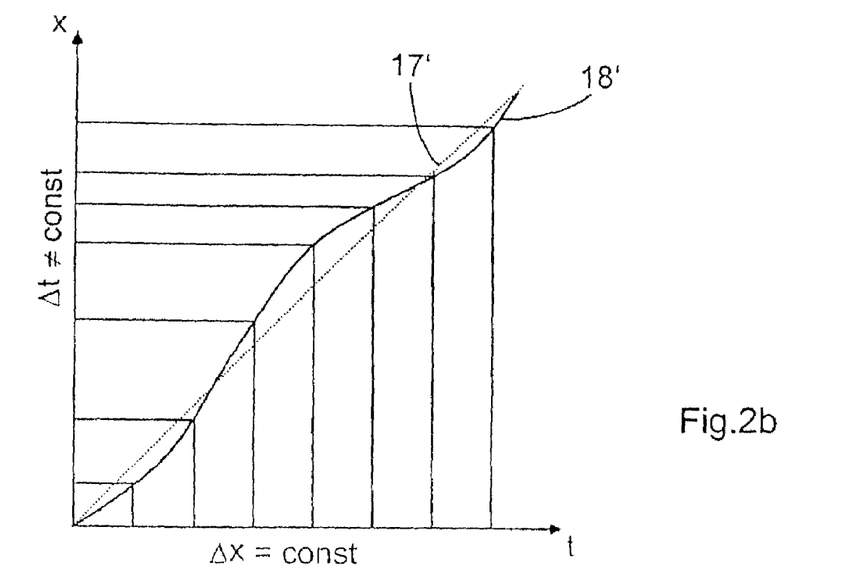

FIG. 2(*a*) shows the path/time diagram for the movement component in the line direction which is to be carried out corresponding to the reference movement 17. However, a curve 18 diverging from this generally occurs in practice. The path differences $\Delta x$ selected for constant time intervals $\Delta t$ show that the scanning light spot sometimes sweeps over a smaller path and sometimes sweeps over a larger path during such a time interval. If a pixel of the appropriate theoretical, and therefore constant, path length $\Delta x$ were allocated to every constant time interval $\Delta t$, the image information actually obtained would be distorted by the nonuniformity of the non-constant path distances $\Delta x$ in FIG. 2(*a*). FIG. 2(*b*) shows the diagram from FIG. 2(*a*) which is mirrored at the angle bisector. Assuming constant path portions $\Delta x$ in contrast to the preceding considerations with respect to the raster of pixels, time intervals $\Delta t$ of unequal length result for the actual scanning movement 18'. Therefore, in order for the image information to be read out correctly, the length of the readout interval would have to be determined individually for each pixel in order to compensate the above-mentioned systematic errors during the movement of the deflecting mirror 5.

For this purpose, the duration of the readout intervals, designated by R in FIG. 4, is initially somewhat reduced, while the duration of all readout intervals remains constant. However, these readout intervals now no longer follow one another in immediate succession or in fixed predetermined time intervals; rather, delay intervals during which no readout takes place are interposed between these readout intervals. The systematic errors in the movement of the deflecting mirror and resulting speed fluctuations in the line direction can be compensated over the length of the respective delay intervals which is determined depending on the deviation in the movement.

Since systematic errors are to be compensated with this procedure, it is sufficient to record the deviations occurring between a reference scanning movement and an actual scanning movement for the movement component in the line direction only once in one calibrating step. This can be carried out, for example, by an exact speed measurement. A reference body of known geometry is preferably used for this purpose. The deviations can then be determined for the individual pixels from the image obtained for a line during the calibrating process. The delay intervals required for the individual pixels between the end of one readout interval and the start of the next readout interval can then be determined from the deviations. The corresponding information on the delay intervals is stored in a storage unit 19 in the control system 11, so that it can be accessed during analysis of an examined substrate 2. Since the systematic error is repeated line for line, it is sufficient to store only the information for one line in the storage unit 19. In a clocked system, this is preferably carried out in that a factor is associated with every address of a pixel in a line, the duration of the respective delay interval being indicated as an integral multiple of system clock units by this factor. In this connection, it is also permissible to store a factor of "zero".

During the scanning of a substrate to be examined, the duration of the delay interval associated with the corresponding pixel is determined after every readout interval R in a delay interval generator 20. The timing will be described more fully with reference to FIG. 4(*a*) and FIG. 4 (*b*) with reference to the system clock S generated by the system clock generator 15 and the curve A of the control of the scanning movement. It is assumed here by way of example that the controlling of the scanning movement, i.e., the advancing of the scanner characteristic line, is carried out with a constant clock interval which, in this case, corresponds to an 18-fold system clock unit. With a system clock of 45 MHz, for example, the forward switching has a clock frequency of 2.5 MHz.

The control of the readout intervals is carried out within the system clock S; however, the constant readout interval R has a shorter duration, for example, 16-times one individual system cycle, which is accordingly shorter than the duration of a scanning cycle. The delay intervals inserted between the individual readout intervals R are designated by $D_n$, where n is the number of the respective pixels in a line.

When the scanning light spot runs ahead of its actual reference position in the direction of a line, the distance between two successive readout intervals R is compensated by short delay intervals $D_2$ or $D_3$, as is shown in FIG. 4(*a*). In the latter case $D_3$, a readout interval R is followed immediately by the next readout interval due to the associated duration of "zero". On the other hand, when the scanning speed in the line direction lags behind the reference scanning movement, it is necessary to wait somewhat longer until the scanning light spot has actually reached the geometric location of the next pixel before starting to read out the image information, as is shown in FIG. 4(b). For this purpose, the delay intervals are lengthened corresponding to $D_n$.

Figure 3A:
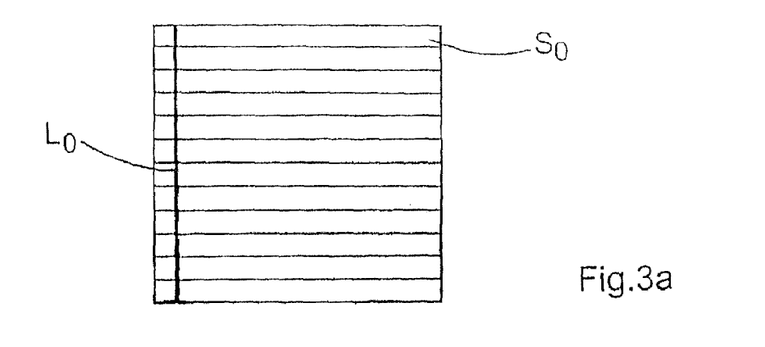
Figure 3B:
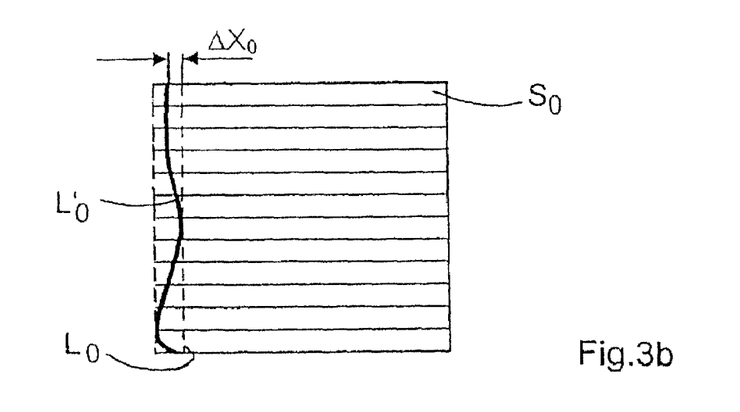
Figure 3C:
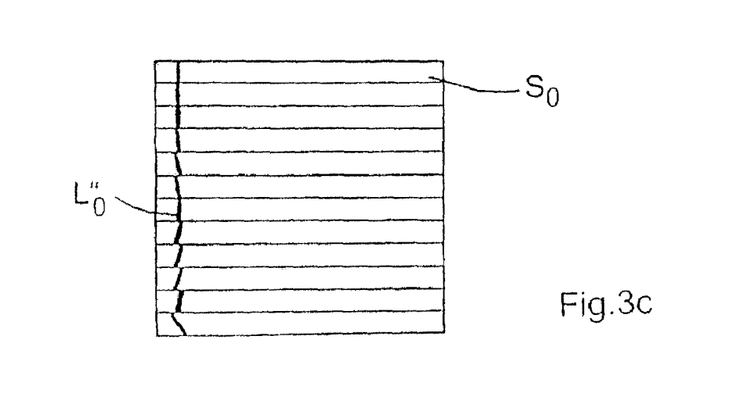

Besides fluctuations in scanning speed in the line direction resulting from the movement of the deflecting mirror 5, other deviations can occur in the line direction as a result of systematic variations of the table transverse to its forward feed movement. This is caused, for example, by geometric irregularities in the linear guide devices of the table 6. When the image information is read out line by line, these variations become noticeable in a relative offset between the lines as is shown in FIG. 3(a) to FIG. 3(c). FIG. 3(a) shows a reference substrate $S_0$ with a straight reference line $L_0$ extending transverse to the line direction with undistorted imaging. Due to the variations in the forward feed of the table, an S-shaped image line $L_0'$ results after the scanning of the reference substrate $S_0$; this S-shaped image line $L_0'$ would have to correspond to image reference line $L_0$ in FIG. 3(b) for imaging that is absolutely free from errors. A correction value can be determined experimentally in a calibrating process for every line from the path deviations $\Delta x_0$, from which it is possible to derive a delay interval $D_0$ by which the start of the readout interval of the first pixel in every line is to be offset, resulting in an image corresponding to FIG. 3c. The information on these delay intervals is stored in the storage device 19 and is accordingly available for subsequent analysis processes for scanning substrates to be examined. The storage unit 19 is constructed in such a way that a recalibration can be carried out, when required, in that the stored information on the individual pixels of a line or on the individual lines can be overwritten with respect to the delay intervals.

The effects of this zero point correction of the movement component transverse to the lines will now be described briefly with reference to FIG. 4(c) and FIG. 4(d) using characteristic lines $P_c$ and $P_d$ for the pixel readout. In both cases, it is assumed that a speed correction has already been carried out in the line direction corresponding to FIG. 4(a). When the substrate table 6 in FIG. 3 executes a deviating movement in the direction of line scanning, the light spot to be examined impinges on the substrate spatially in front of the actual start of the line. This is compensated in FIG. 4(c) by a delay interval $D_0$ which is inserted before the first readout interval R of a line. In the reverse case which is shown in FIG. 4(d), a certain negative duration representing a shifting forward of the start of the first readout interval is allotted to the delay interval. It can be seen from a comparison of the characteristic lines $P_n$ in FIG. 4(c) and FIG. 4(d) on the one hand and FIG. 4(a) on the other hand that the line offset at the beginning of a line continues over the entire line, so that an offset of the entire line can be corrected solely by delay interval $D_0$ which is inserted in front and which is determined individually for each line.

Both of the methods described above can be used independently, in principle, for improving image quality. However, the best results for image rectification are achieved through a combination of the two procedures.

While the foregoing description and drawings represent the present invention, it will be obvious to those skilled in the art that various changes may be made therein without departing from the true spirit and scope of the present invention.

LIST OF REFERENCE NUMBERS 1 scanning device
2 substrate
3 laser source
4 photomultiplier
5 deflecting mirror
6 table
7 pixel
8 curve of the center point of a scanning light spot
9 light spot
10 line reversal area
11 control system
12 control device for table 6
13 control device for deflecting mirror 5
14 photomultiplier control
15 system clock generator
16 image data storage
17, 17' reference scanning movement
18, 18' actual scanning movement
19 storage unit
20 delay interval generator
A control clock
S system clock
P readout clock
R, R' readout intervals
$D_n$ delay intervals (n=0 . . . N)
$S_0$ reference substrate
$L_0$ reference line on the reference substrate
$L_0'$, $L_0''$ image lines (before and after correction)
N quantity of pixels in a scanning period

The invention claimed is:

1. A method for electronic image rectification in pixel-by-pixel scanning of a substrate by means of a bundled electromagnetic beam, especially a laser beam, in which the pixels are read out in readout intervals of constant predetermined duration comprising the steps of:
   determining the deviation between a reference scanning movement and an actual scanning movement is determined in a calibration process;
   determining a delay interval depending on the deviation for a pixel and the start of the readout interval for said pixel or for the subsequent pixel is delayed by said delay interval;
   storing the information about the delay interval and accessing the stored information in an analysis process for examining the substrate for the pixel; and
   adding the delay interval before or after the readout interval.

2. The method according to claim 1, wherein the substrate is scanned line by line, every line comprising a multitude of pixels, wherein a delay interval which is to be inserted subsequently is determined in the calibrating process for every pixel of a line depending on the deviation and the information on the delay intervals is stored, and wherein the information is accessed in the analysis process for every pixel and the delay interval which is obtained for the respective pixel from the stored information and in which no readout takes place is carried out after the readout interval.

3. The method according to claim 2, wherein the information on the delay interval associated with the pixel is stored individually for each pixel during the calibrating process so as to be correlated to its address in the line, and in that the information with the same address in the line is accessed in the analysis process for every pixel.

4. The method according to claim 2, wherein all lines of the substrate are scanned in the same direction.

5. The method according to claim 2, wherein the control of the scanning movement and the readout of the pixels are carried out in a timed manner, the scanning movement being controlled by a scanning clock whose duration is an integral multiple of a system clock unit, the constant duration of the readout intervals is an integral multiple of the system clock unit, and the duration of the delay intervals is a variable integral multiple of the system clock unit or is zero, in that the duration of the readout interval is shorter than the duration of the scanning clock, and in that the readout interval of a pixel is started immediately following the conclusion of a delay interval.

6. The method according to claim 5, wherein the duration of the longest delay interval that can be added subsequently is twice as long as the difference of the duration between the control clock and the readout interval.

7. The method according to claim 2, wherein a linear path/time function is predetermined as reference scanning movement in the line direction.

8. The method according to claim 1, for a scanning device, wherein the electromagnetic beam is guided over a line of the substrate by a swivelable, driven deflecting mirror.

9. The method according to claim 1, wherein an optical grating is used as a reference substrate.

10. The method according to claim 1, wherein the substrate is scanned line by line, every line comprises a multitude of pixels, and the scanning movement has a movement component in the line direction and a movement component transverse to the line direction, wherein the deviation of the transverse movement in the line direction between the reference scanning movement and the scanning movement actually carried out on the reference substrate is determined in the calibrating process for every first pixel of a line, a delay interval which is to be inserted in front and which has a positive or negative duration by which the start of the readout interval is to be offset in order to compensate for deviations is determined depending on the deviation, the information about the delay interval to be inserted in front is stored for each line, the information which concerns the delay interval to be inserted in front and which is stored for the respective line is accessed in the analysis process for every first pixel of a line and the start of the readout interval of the first pixel of the line is offset in time by the delay interval.

11. The method according to claim 10, wherein the duration of the delay interval to be inserted in front is defined as a multiple of system clock units.

12. The method according to claim 10, wherein a linear path/time function is predetermined as reference transverse movement component.

13. The method according to claim 10, for a scanning device, wherein the substrate is moved under the electromagnetic beam in a continuous movement in the direction transverse to the lines.

* * * * *